US006578761B1

United States Patent
Spector

(12) United States Patent
(10) Patent No.: US 6,578,761 B1
(45) Date of Patent: Jun. 17, 2003

(54) METHOD FOR ISSUANCE OF SATELLITE CREDIT AND DEBIT CARDS

(76) Inventor: Donald Spector, 380 Mountain Rd., Union City, NJ (US) 07087

( * ) Notice: Subject to any disclaimer, the term of this patent is extended or adjusted under 35 U.S.C. 154(b) by 0 days.

(21) Appl. No.: 09/642,516

(22) Filed: Aug. 18, 2000

(51) Int. Cl.[7] .................................................. G06K 5/00
(52) U.S. Cl. ...................... 235/380; 235/383; 235/487; 235/492; 705/41; 705/44
(58) Field of Search ................................. 235/380, 492, 235/383, 487; 705/44, 41

(56) References Cited

U.S. PATENT DOCUMENTS

| | | | | |
|---|---|---|---|---|
| 4,454,414 A | * | 6/1984 | Benton | 235/379 |
| 5,359,182 A | * | 10/1994 | Schilling | 235/375 |
| 5,864,830 A | * | 1/1999 | Armetta et al. | 235/380 |
| 5,986,651 A | * | 11/1999 | Reber et al. | 235/380 |
| 6,169,975 B1 | * | 1/2001 | White et al. | 235/381 |
| 6,325,285 B1 | * | 12/2001 | Baratelli | 235/380 |
| 6,386,451 B1 | * | 5/2002 | Sehr | 235/384 |
| 6,422,462 B1 | * | 7/2002 | Cohen | 235/381 |

* cited by examiner

*Primary Examiner*—Michael G. Lee
*Assistant Examiner*—Seung H Lee
(74) *Attorney, Agent, or Firm*—Mitchell A. Stein; Stein Law, P.C.

(57) ABSTRACT

The present invention relates to a method for a credit card holder to issue satellite debit cards out of his pre-established credit card, without the need for prior approval by his credit card company. The satellite card could be issued to himself or to any other party, and the information regarding this satellite card would be electronically transmitted to the recipient of the card. The recipient would then utilize this information to print out a unique Satellite Card, which can be accepted by merchants for purchases or for obtaining cash.

18 Claims, 1 Drawing Sheet

METHOD FOR ISSUANCE OF SATELLITE CREDIT AND DEBIT CARDS

FIELD OF THE INVENTION

The field of the invention is financial instruments, in particular the field of credit and debit cards.

BACKGROUND OF THE INVENTION

There has always existed a need for sending money to a third party expeditiously. Wire transfer services such as Western Union® have long existed to facilitate the rapid transfer of funds to another party in the event of an emergency. Nonetheless, the recipient cannot obtain the cash payment unless they visit one of the wire transfer agents of the wire transfer service. There may not be an agent at the locale of the recipient, the agent may not be conveniently located, or the agent may not be open for business at that time.

Western Union®, for example, claims it has over 80,000 agents worldwide where funds could be wired (figure quoted on www.westernunion.com, August 2000). However, with the explosion of the Internet globally in recent years, it has become a relatively simple process to obtain Internet access at any locale. Undoubtedly there are orders of magnitude more places where an intended recipient of funds can go to gain Internet access than there are wire transfer agents.

Recently, many Internet Payment Companies ("IPCs") such as Paypal.com or CCNow.com were established to take advantage of the convenience and penetration of the Internet to facilitate the transfer of funds. Using these services, it is possible to transfer funds from one party's credit card account to a recipient's account with the IPC. However, before he can use the funds the recipient has to first transfer it from his IPC account to his existing credit card or bank account. In many cases it can take a few business days for the transfer to be completed and the funds to become available.

Further, it is desirable in many situations such as when the recipient is traveling, or when he wants to set a fixed budget that the transferred funds isn't given in the form of cash. In situations such as these, the recipient may be the original credit card holder himself. Although traveler's checks have long been available to provide security against thieves and pickpockets, they are well-known to be cumbersome to use and not welcomed by many merchants. Further, it can be difficult to obtain a refund when the traveler's checks are lost or stolen if records on how much was cashed wasn't kept.

A need exists for a system to facilitate the transfer of funds which addresses the deficiencies of conventional methods in availability, convenience and security.

SUMMARY OF THE INVENTION

Figure 1:
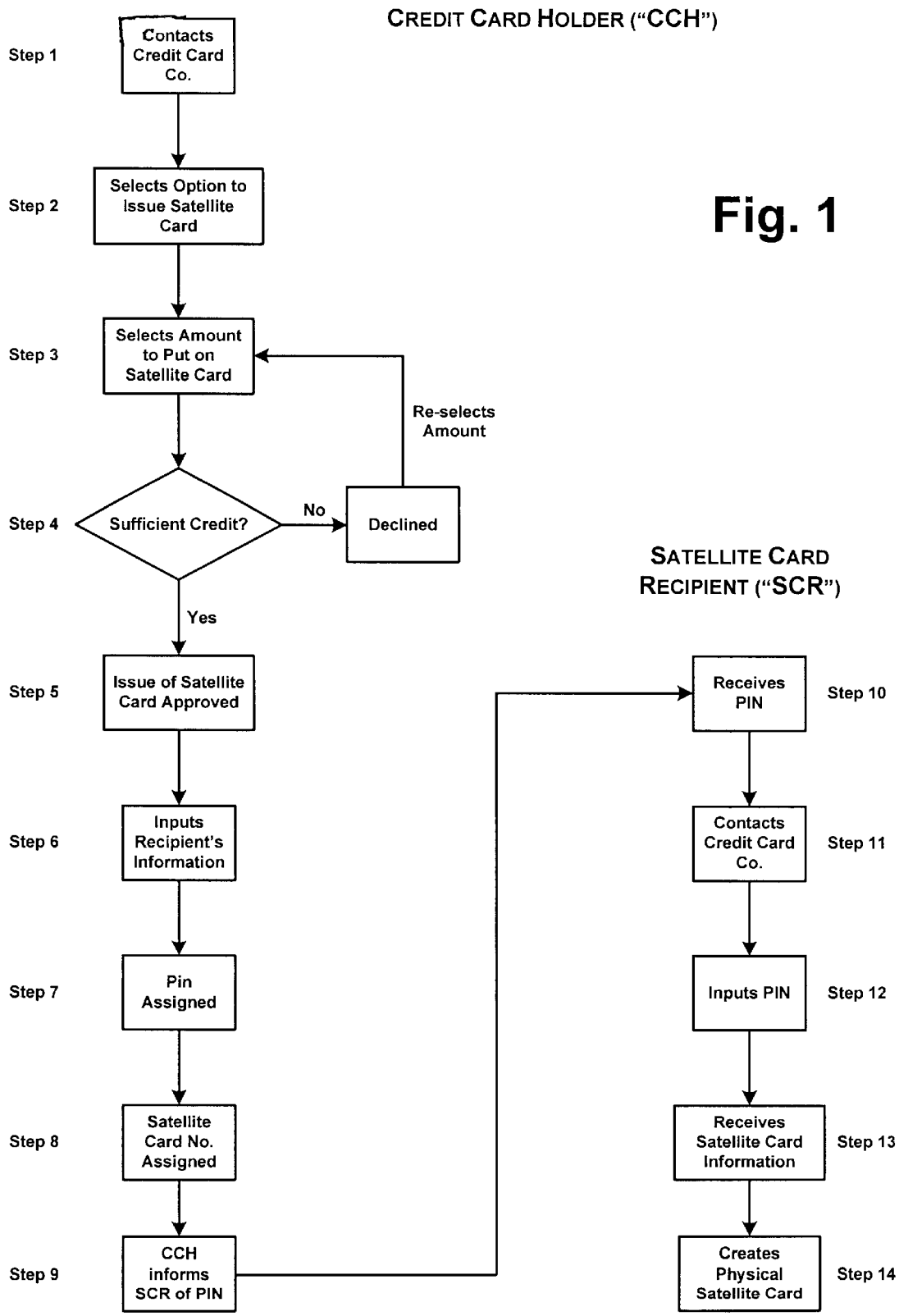
FIG. 1 is a flowchart outlining the process of issuing a Satellite Card.

It is an object of the present invention to be able to transfer funds from a holder of a pre-established credit card account to a recipient that can be accessed anytime and anywhere in the world with a computer with access to the Internet. The recipient would not need to go through an agent and would not need to have a credit card account, a bank account or an account with an IPC.

Another object of the invention is to provide added security to the recipient in situations such as travel to a foreign country, without the need to bring cash or to resort to the use of cumbersome travelers' checks. Towards this end, the invention allows a recipient of the fund transfer to print out a unique, personalized credit card associated with a unique Personal Identification Number (PIN) that would facilitate transactions with merchants or used to obtain cash.

Therefore, according to the invention, a system is provided for a credit card holder to issue "Satellite Cards ("SC")" to himself or to a third-party recipient.

DETAILED DESCRIPTION OF THE INVENTION

According to one aspect of the invention, as shown in FIG. 1, the credit card holder ("CCH") begins the process of the issuance of the SC by contacting his credit card company. (Step 1 in FIG. 1) In the preferred embodiment, he does this by accessing his credit card account on the Internet. The CCH would log into a website on the Internet in much the same way current credit card sites are accessed, typically through the use of a password or PIN. The connection to the site should be encrypted by commonly available methods. Once inside the secure credit card site the CCH would have the option to issue a satellite card (Step 2 in FIG. 1).

Alternatively, the SC can be issued by software that would run on a computer, typically a personal computer such as an IBM-compatible or a Macintosh® that would handle the transaction. The software can notify the credit card company of the issuance of this SC by connecting to the credit card company's computer system either through a direct dial-up or through the Internet. The CCH may also notify the credit card company by a telephone call to the credit card company's representatives. This software can also generate a printable copy of the SC printable through a printer connected to the computer.

In one embodiment of the invention, the SC issued will be a Satellite Debit Card ("SDC"). When the CCH issues a SDC, he is immediately charged the amount as if he had obtained a cash advance. The amount is issued to the SDC and any amount spent by the SDC recipient will be deducted from the amount left on the SDC. For example, the CCH has $10,000 available credit on his original card credit card and wants to issue a SDC with a value of $2,000.00. When the SDC is issued, the CCH is charged $2,000.00 immediately on his original card at his current Annual Percentage Rate ("ADR") for cash advances. The issued SDC will have an initial value of $2000.00 and purchases made and cash withdrawals will be deducted from this amount. The advantage of this embodiment is that the CCH does not require any pre-approval from his credit card company to issue the SDC because the transaction will be viewed as a cash advance from the CCH's available credit.

In another embodiment of the invention, the SC issued will be a Satellite Credit Card ("SCC"). When the CCH chooses the option to issue a SCC, he extends his personal credit to the SCC recipient and the available credit on the original card is reduced accordingly. For example, the CCH has $10,000.00 available credit on his original credit card and wants to issue a SCC with a $2,000.00 credit limit. When the SCC is issued, the CCH's available credit is reduced by $2,000.00 to $8,000.00. In this embodiment, the CCH remains responsible for payment of charges on the SCC to his credit card company, but any purchases or cash withdrawals made with the SCC do not incur interest charges from the credit card company until a purchase or cash withdrawal is actually made. Another advantage of this embodiment is that there is no need to re-transfer any unused amounts on the SCC because no actual transfer of funds Oust the extension of a credit line) has taken place.

When the CCH initiates the issuance of a SC by selecting the amount to be issued (Step 3, FIG. 1), the system checks to see if he has sufficient available credit on his credit card for the amount requested (Step 4, FIG. 1). Other checks and safeguards can be built into this step, such as limiting the number of outstanding issued SCs (so that the CCH can not become, in essence, a "loanshark" to people who cannot obtain credit cards on their own). If the request is approved, the system informs the CCH that he can proceed (step 5, FIG. 1).

The CCH holder would input the name of the SC recipient to the credit card company's computer. Other information, such as the address of the recipient, and where the SC would be used, could also be input and recorded (Step 6, FIG. 1). The CCH would also select a PIN, or be assigned one by the system, for the SC recipient to obtain the card (Step 7, FIG. 1). An unique number similar in format to credit card numbers will be generated and assigned to each SC (Step 8, FIG. 1). Preferably, the number on the SC will be sufficiently different from the credit card number of the CCH so that the original number cannot be deduced from the number of the issued SC.

The CCH holder will inform his recipient, (which, as already discussed, could be himself) of the PIN by means of an encrypted or otherwise secure e-mail message, or through a voice conversation (Step 9, FIG. 1). Once the intended recipient receives the PIN (Step 10, FIG. 1), he can contact the credit card company (Step 11, FIG. 1) and inform the company of his name and the PIN (Step 12, FIG. 1) in order to issue the Satellite card. In the preferred embodiment the recipient can log onto the credit card company's website with the PIN, for the sole purpose of obtaining the SC. When the recipient logs onto the website, he should be brought immediately to a secure page through which the physical SC would be generated.

The physical embodiment of the SC can be created by means of ordinary computer printers such as laser printers or ink-jet printers connected to the computer or terminal from which the SC recipient assesses the credit card company website. From the website, the SC recipient can download (Step 13, FIG. 1) and print out a graphical representation of the SC (Step 14, FIG. 1). The downloading and printing may be accomplished by a simple "print screen" command from the Internet browser software so that no additional software is needed. In the preferred embodiment, the SC is just an ordinary paper card printed on ordinary paper stock. Pre-perforated light cardboard specially made for printing out of these cards may also be used. The SC may additionally be imprinted with a barcode which can be scanned by a merchant with a scanner. A picture of the intended recipient can also be printed on the SC if it is input by the CCH.

In another embodiment of the invention, the SC could be issued by dedicated kiosks at selected locations such as airports or hotels. These kiosks could have dedicated magnetic strip writers for the purpose of issuing SCs imprinted with a magnetic information strip that can be read by ordinary credit card readers.

The SC will contain, at a minimum, three pieces of information: The SC number, the name of the SC holder (recipient) and the name of the credit card company issuing the card. The credit card company's telephone number can also be listed. A SC (without a magnetic strip) is used much the same way a credit card is used when the merchant does not have a credit card reader, the reader is inoperative, or the reader fails to read the magnetic strip on the credit card. The merchant will make a telephone call to the credit card company to verify the validity of the card and the credit limit or funds available to it. Additionally, the merchant may require picture identification from the SC holder to see if the name (or picture) on the card matches the identification.

What is claimed is:

1. A method for issuing Satellite Cards by a Credit Card Holder comprising the steps of:
    the Credit Card Holder contacting the Holder's credit card company by accessing a secure website of said company on the Internet;
    the Credit Card Holder inputting the amount to be issued to the Satellite Card;
    the Credit Card Company determining if the Credit Card Holder has sufficient credit to cover the amount to be issued to the Satellite Card, and approving the issue of Satellite Card if there is sufficient credit;
    the Credit Card Company generating a Satellite Card number and Personal Identification Code, and informing the Credit Card Holder of same, and
    the Satellite Card and the Personal Identification Code being transmitted by an encrypted internet message to an intended recipient of the Satellite Card.

2. The method of claim 1, further comprising the step of the intended Recipient of the Satellite Card downloading and generating a physical copy of the Satellite Card through a computer printer.

3. The method of claim 2, wherein the physical copy of the Satellite Card includes a picture of the Satellite Card Recipient.

4. The method of claim 2, wherein the intended recipient of the Satellite Card downloads and generates a physical copy of the Satellite Card by means of a dedicated kiosk.

5. The method of claim 4, wherein the dedicated kiosk has an attached magnetic strip writer for writing magnetic strips imprinted on plastic cards.

6. The method of claim 5, wherein the physical copy of the Satellite Card is a plastic card imprinted with a magnetic strip.

7. The method of claim 1, wherein the Satellite Card is a Satellite Credit Card.

8. The method of claim 1, wherein the Satellite Card is a Satellite Debit Card.

9. The method of claim 1, wherein the physical copy of the Satellite Card is imprinted with a barcode readable with a barcode reader.

10. The method of claim 1, wherein the Credit Card Holder contacts the credit card company by means of a dedicated software for issuing Satellite Cards.

11. The method of claim 10, wherein the dedicated software generates a printable copy of the Satellite Card.

12. The method of claim 1, further comprising the step of the Credit Card Holder selecting a lower amount to be issued to the Satellite Card if the original amount was declined by the credit card company.

13. The method of claim 1, further comprising the step of the Credit Card Holder informing the credit card company of the particulars of the intended Satellite Card Recipient, and the credit card company recording said particulars.

14. The method of claim 1, further comprising the step of the Credit Card Holder selecting an option to issue a Satellite Card at the secure website.

15. The method of claim 1, further comprising the step of the intended Recipient of the Satellite Card obtaining the Satellite Card by accessing the credit card company's secure website.

16. The method of claim 15, wherein the intended Recipient of the Satellite Card accesses the secure website by means of the Personal Identification Card transmitted to the intended Recipient by the Credit Card Holder.

17. A method for issuing Satellite Cards by a Credit Card Holder comprising the steps of:

the Credit Card Holder contacting the Holder's credit card company by accessing a secure website of said company on the Internet;

the Credit Card Holder inputting the amount to be issued to the Satellite Card;

the Credit Card Company determining if the Credit Card Holder has sufficient credit to cover the amount to be issued to the Satellite Card, approving the issue of Satellite Card if there is sufficient credit;

the Credit Card Company generating a Satellite Card number and Personal Identification Code, and informing the Credit Card Holder of same;

the Satellite Card and the Personal Identification Code being transmitted by an encrypted internet message to an intended Recipient of the Satellite Card; and the intended Recipient of the Satellite Card downloading and generating a physical copy of the Satellite Card through a computer printer.

18. A method for issuing Satellite Cards by a Credit Card Holder comprising the steps of:

the Credit Card Holder contacting the Holder's credit card company by accessing a secure website of said company on the Internet;

the Credit Card Holder inputting the amount to be issued to the Satellite Card;

the Credit Card Company determining if the Credit Card Holder has sufficient credit to cover the amount to be issued to the Satellite Card, and approving the issue of Satellite Card if there is sufficient credit;

the Credit Card Company generating a Satellite Card number and Personal Identification Code, and informing the Credit Card Holder of same;

the Satellite Card and the Personal Identification Code being transmitted by an encrypted internet message to an intended Recipient of the Satellite Card;

the intended Recipient of the Satellite Card downloading and generating a physical copy of the Satellite Card through a computer printer; and wherein the physical copy of the Satellite Card is imprinted with a barcode readable with a barcode reader and includes a picture of the Satellite Card Recipient.

\* \* \* \* \*